United States Patent
Liu et al.

(10) Patent No.: US 11,985,422 B2
(45) Date of Patent: May 14, 2024

(54) DUAL-LENS MOVEMENT CONTROL SYSTEM, DUAL-LENS MOVEMENT CONTROL METHOD AND NON-TRANSITORY COMPUTER READABLE MEDIUM

(71) Applicant: AVer Information Inc., New Taipei (TW)

(72) Inventors: Te-Yu Liu, New Taipei (TW); Shih-Fu Tsai, New Taipei (TW); Kuo-Hao Huang, New Taipei (TW)

(73) Assignee: AVer Information Inc., New Taipei (TW)

( * ) Notice: Subject to any disclaimer, the term of this patent is extended or adjusted under 35 U.S.C. 154(b) by 239 days.

(21) Appl. No.: 17/657,360

(22) Filed: Mar. 31, 2022

(65) Prior Publication Data
US 2022/0321793 A1 Oct. 6, 2022

(30) Foreign Application Priority Data
Mar. 31, 2021 (TW) ................... 110111946

(51) Int. Cl.
*H04N 23/67* (2023.01)
*G03B 13/34* (2021.01)

(52) U.S. Cl.
CPC .......... *H04N 23/676* (2023.01); *G03B 13/34* (2013.01)

(58) Field of Classification Search
CPC ...... H04N 23/676; H04N 23/69; H04N 23/90; H04N 23/698; G03B 13/34; G03B 37/02; G03B 37/04
See application file for complete search history.

(56) References Cited

U.S. PATENT DOCUMENTS

| | | | | |
|---|---|---|---|---|
| 4,999,713 | A * | 3/1991 | Ueno | H04N 13/239 352/57 |
| 6,055,014 | A * | 4/2000 | Hosonuma | H04N 23/695 348/169 |
| 8,427,538 | B2 * | 4/2013 | Ahiska | H04N 23/62 348/143 |
| 9,602,700 | B2 * | 3/2017 | Ahiska | H04N 23/661 |
| 11,122,215 | B2 * | 9/2021 | Ono | H04N 23/71 |
| 2006/0275025 | A1 * | 12/2006 | Labaziewicz | H04N 23/55 348/E5.042 |
| 2007/0109671 | A1 * | 5/2007 | Teramoto | G03B 13/34 359/811 |
| 2007/0182833 | A1 * | 8/2007 | Toyofuku | H04N 5/262 348/E5.042 |
| 2008/0218612 | A1 * | 9/2008 | Border | G03B 13/36 348/262 |
| 2014/0168383 | A1 * | 6/2014 | Murakami | H04N 13/296 348/47 |

(Continued)

FOREIGN PATENT DOCUMENTS

| CN | 1976445 A | 6/2007 |
|---|---|---|
| CN | 111432187 A | 7/2020 |

*Primary Examiner* — Chiawei Chen
(74) *Attorney, Agent, or Firm* — CKC & Partners Co., LLC

(57) ABSTRACT

The present disclosure provides a dual-lens movement control method, which includes steps as follows. The tracking target is detected through the wide-angle lens, and the final tracking range is calculated; the magnification and the position are determined according to the final tracking range; the separate mode or the alignment mode is determined according to the magnification and the position.

20 Claims, 4 Drawing Sheets

(56) References Cited

U.S. PATENT DOCUMENTS

| | | | |
|---|---|---|---|
| 2014/0307054 A1* | 10/2014 | Chang | H04N 23/67 |
| | | | 348/47 |
| 2014/0327743 A1* | 11/2014 | Chou | H04N 23/676 |
| | | | 348/47 |
| 2015/0201182 A1* | 7/2015 | Chang | H04N 13/239 |
| | | | 348/47 |
| 2017/0289461 A1* | 10/2017 | Ono | H04N 5/44504 |
| 2018/0070010 A1* | 3/2018 | Wang | H04N 23/63 |

* cited by examiner

DUAL-LENS MOVEMENT CONTROL SYSTEM, DUAL-LENS MOVEMENT CONTROL METHOD AND NON-TRANSITORY COMPUTER READABLE MEDIUM

CROSS-REFERENCE TO RELATED APPLICATION

This application claims priority to Taiwan Application Ser. No. 110111946, filed Mar. 31, 2021, which is herein incorporated by reference.

BACKGROUND

Field of Invention

The present invention relates to systems and methods, and more particularly, a dual-lens movement control systems and a dual-lens movement control method.

Description of Related Art

Currently, there are mainly two kinds of conventional technologies, one of which is that the wide-angle lens and the telescope are fixed on the same structure and move together. However, when the viewing angle of the telescope moves, the wide-angle lens is also offset, the full center view is prevented from being seen. When the wide-angle lens is returned to the center, the telescope is also returned, resulting in no view of the edges.

The other is that the wide-angle lens is fixed, and the telescope outputs the displaying image only. At this time, the wide-angle lens is only used for detection purposes, and thus the advantages of the wide-angle lens with wide viewing angle cannot be more effectively utilized.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides a dual-lens movement control system and a dual-lens movement control method, to solve or circumvent aforesaid problems and disadvantages in the related art.

An embodiment of the present disclosure is related to a dual-lens movement control system includes a wide-angle lens, a telescope, a motor device and a processor. The motor device is connected to the wide-angle lens and the telescope. The processor is electrically connected to the motor device. The processor is configured for: detecting at least one tracking target through the wide-angle lens, and calculating a final tracking range; determining a magnification and a position according to the final tracking range; determining a separate mode or an alignment mode according to the magnification and the position.

Another embodiment of the present disclosure is related to a dual-lens movement control method includes steps of: detecting at least one tracking target through the wide-angle lens, and calculating a final tracking range; determining a magnification and a position according to the final tracking range; determining a separate mode or an alignment mode according to the magnification and the position.

Yet another embodiment of the present disclosure is related to a non-transitory computer readable medium to store a plurality of instructions for commanding a computer to execute a dual-lens movement control method, and the dual-lens movement control method includes steps of: detecting at least one tracking target through the wide-angle lens, and calculating a final tracking range; determining a magnification and a position according to the final tracking range; determining a separate mode or an alignment mode according to the magnification and the position.

In view of the above, according to the present disclosure, more effective use of the respective characteristics of the two camera components (i.e., the wide-angle lens and the telescope) is accomplished, and the accuracy of the auto framing is improved during automatic tracking.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
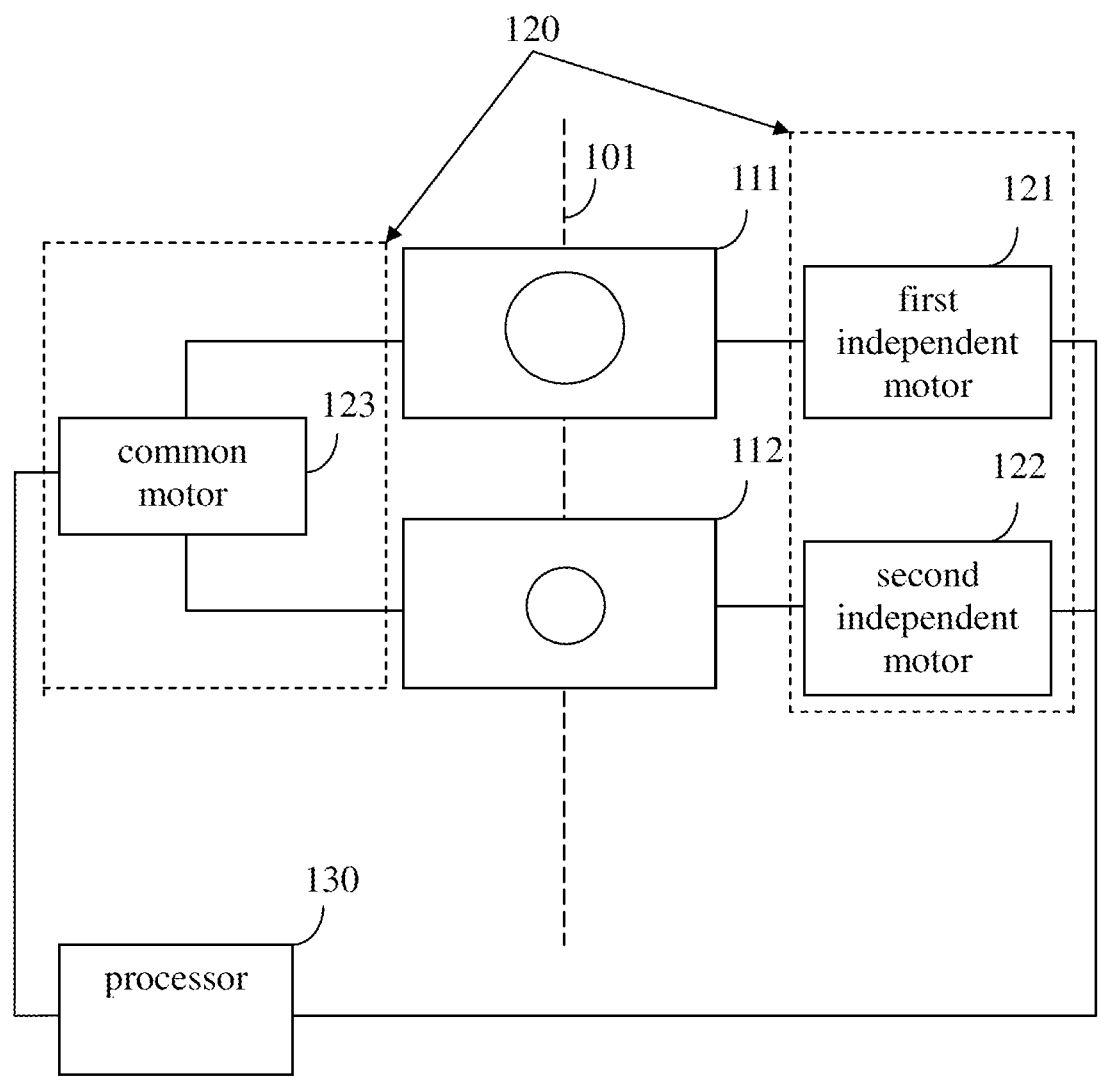
FIG. 1 is a block diagram of a dual-lens movement control system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It should be noted that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used in the description herein and throughout the claims that follow, the meaning of "a", "an", and "the" includes reference to the plural unless the context clearly dictates otherwise.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

FIG. 1 is a block diagram of a dual-lens movement control system 100 according to one embodiment of the present disclosure. As shown in FIG. 1, the system 100 includes a wide-angle lens 111, a telescope 112, a motor device 120 and a processor 130. In FIG. 1, the motor device 120 can include a first independent motor 121, a second independent motor 122 and a common motor 123. For example, the processor 130 is a processor circuit or a controller, the first independent motor 121 is a first independent horizontal rotation motor, the second independent motor 122 is a second independent horizontal rotation motor, and the common motor 123 is a common horizontal rotation motor. The wide-angle lens 111 and the telescope 112 are arranged in the same rotation axis 101, so that the optical axes of the wide-angle lens 111 and the telescope 112 can be superimposed, so as to simulate the optical zoom.

In structure, the motor device 120 is connected to the wide-angle lens 111 and the telescope 112, where the first independent motor 121 is connected to the wide-angle lens 111, the second independent motor 122 is connected to the telescope 112, and the common motor 123 is connected to the wide-angle lens 111 and the telescope 112. The processor 130 is electrically connected to the first independent motor 121, the second independent motor 122 and the common motor 123.

In use, the processor 130 detects at least one tracking target through the wide-angle lens 111 and calculates a final tracking range (e.g., a range of human body peripheral extension). The processor 130 determines a magnification (e.g., a maximum image magnification) and a position (e.g., an image position) according to the final tracking range. The processor 130 determines a separate mode or an alignment mode according to the magnification and the position. For example, the separate mode is that the wide-angle lens 111 and the telescope 112 can move independently, and the alignment mode is that the optical axes of the wide-angle lens 111 and the telescope 112 are superimposed, and the wide-angle lens 111 and the telescope 112 move synchronously.

In one embodiment of the present disclosure, in the alignment mode, the processor 120 moves the wide-angle lens 111 and the telescope 112 synchronously through the motor device 120 (e.g., the common motor 123), and outputs a displaying image of the wide-angle lens 111.

In one embodiment of the present disclosure, when the at least one tracking target changes (e.g., one or more tracking targets move, or the number of the tracking targets increases or decreases) and when the processor 130 determines that a displaying image of the telescope 112 is sufficient to cover the final tracking range, the processor 130 starts to zoom in the displaying image of the wide-angle lens 111. When a viewing angle of the wide-angle lens matches a viewing angle of the telescope, the processor 130 switches to output the displaying image of the telescope 112, so as to simulate optical zoom for seamless switching; at this time, the processor 130 enters or operates in the separate mode. In the separate mode, the processor 130 controls the wide-angle lens 111 and the telescope 112 respectively through the motor device 120 (e.g., the first independent motor 121 and the second independent motor 122), so that the displaying image of the telescope 112 is enlarged to cover the final tracking range, the displaying image of the wide-angle lens 111 is zoomed out to a widest-angle end (e.g., 1× screen; the displaying image of one times), and the wide-angle lens 111 returns to a central orientation through the motor device 120 (e.g., the first independent motor 121). In this way, the wide-angle lens 111 can simultaneously capture the central image (i.e., the image with the largest amplitude), and the processor 130 then performs auto framing analysis, such as detecting the tracking target, calculating the final tracking range, determining the magnification and position and so forth.

In one embodiment of the present disclosure, when the at least one tracking target changes again, and when the processor 130 determines that the displaying image of the telescope 112 is incapable of covering the last tracking range, the processor 130 zooms out the displaying image of the telescope 112, zooms in the displaying image of the wide-angle lens 110, moves the wide-angle lens 110 through the motor device 120 (e.g., the first independent motor 121) until the viewing angle of the wide-angle lens 110 matches the viewing angle of the telescope 112, switches to output the displaying image of the wide-angle lens 110, so as to simulate optical zoom for seamless switching; at this time, the processor 130 enters or operates in the alignment mode.

Figure 2:
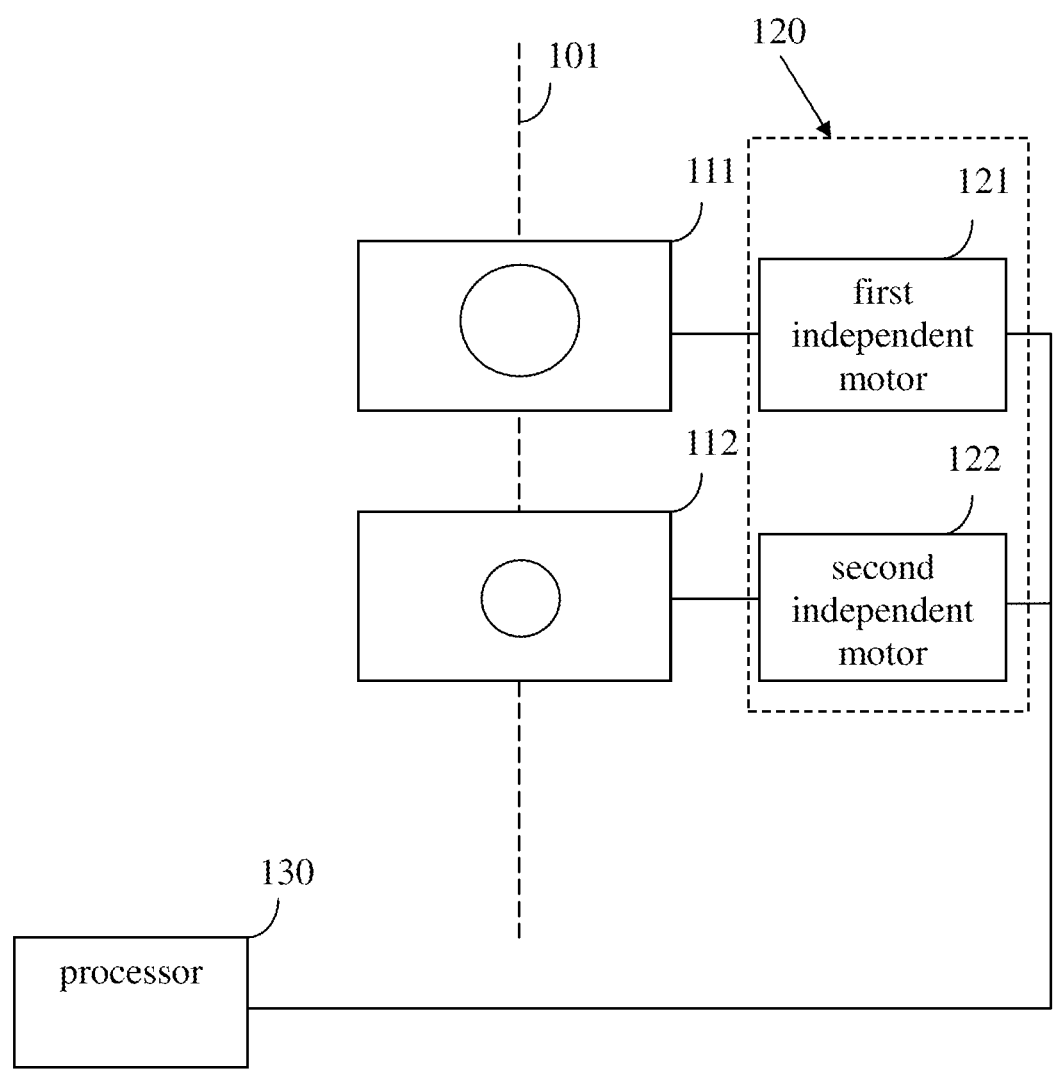
FIG. 2 is a block diagram of a dual-lens movement control system according to another embodiment of the present disclosure.

FIG. 2 is a block diagram of a dual-lens movement control system 200 according to another embodiment of the present disclosure, referring FIGS. 1-2, in structure the dual-lens movement control system 200 is substantially the same as the dual-lens movement control system 100 of FIG. 1, except that the common motor 123 is omitted from the motor device 120 of the FIG. 2. In the alignment mode, the processor 130 can cooperatively control the first and second independent motors 121 and 122, so that the optical axes of the wide-angle lens 111 and the telescope 112 can be superimposed, and the wide-angle lens 111 and the telescope 112 can move synchronously. In the separate mode, the wide-angle lens 111 and the telescope 112 can be moved through the first and second independent motors 121 and 122 respectively.

Figure 3:
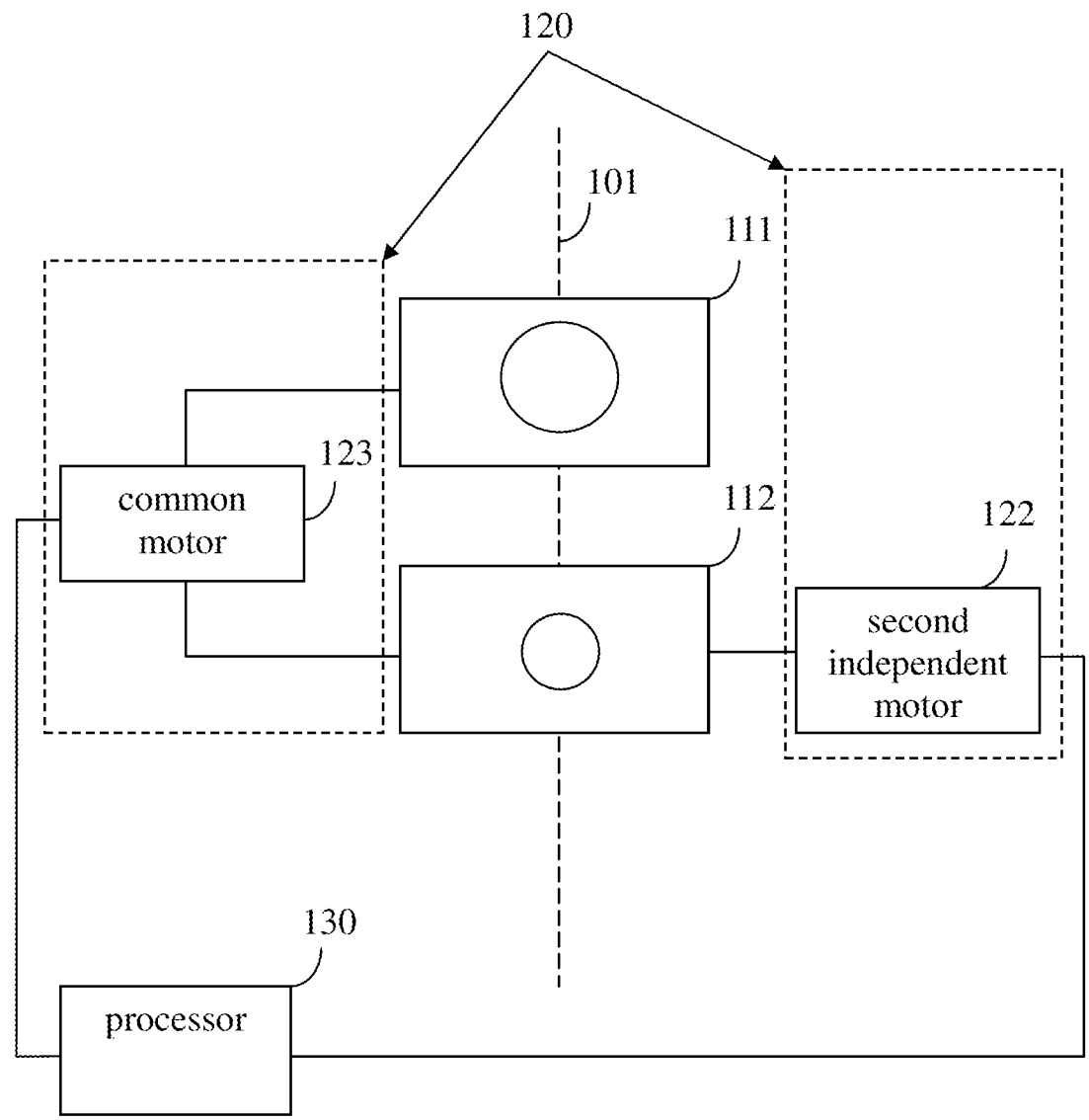
FIG. 3 is a block diagram of a dual-lens movement control system according to yet another embodiment of the present disclosure.

FIG. 3 is a block diagram of a dual-lens movement control system 300 according to yet another embodiment of the present disclosure, referring FIG. 1 and FIG. 2, in structure the dual-lens movement control system 300 is substantially the same as the dual-lens movement control system 100 of FIG. 1, except that the first independent motor 121 is omitted from the motor device 120 of the FIG. 3. In the alignment mode, the processor 130 can cooperatively control the first and second independent motors 121 and 122, so that the optical axes of the wide-angle lens 111 and the telescope 112 can be superimposed, and the wide-angle lens 111 and the telescope 112 can move synchronously. In the separate mode, the wide-angle lens 111 can be moved by the common motor 123; although the common motor 123 also drives the telescope 112, the movement of the telescope 112 can be adjusted independently by the second independent motor 122.

Figure 4:
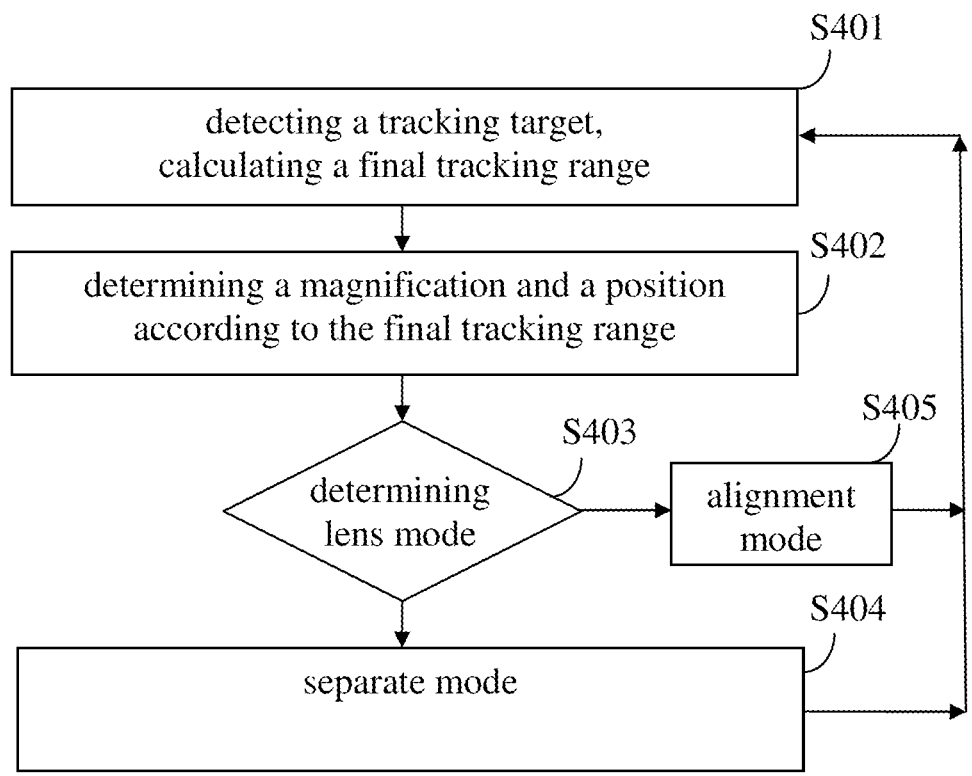
FIG. 4 is a flow chart of a dual-lens movement control method according to yet another embodiment of the present disclosure.

For a more complete understanding of a method performed by the systems 100, 200 and 300, referring FIGS. 1-4, FIG. 4 is a flow chart of a dual-lens movement control method 400 according to one embodiment of the present disclosure. As shown in FIG. 4, the dual-lens movement control method 400 includes operations S401-S405. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In operation S401, at least one tracking target is detected through the wide-angle lens 111, and a final tracking range is calculated. In operation S402, a magnification and a position are determined according to the final tracking range. In operation S403, a separate mode or an alignment mode is determined according to the magnification and the position.

In operation S405, in the alignment mode, the wide-angle lens 111 and the telescope 112 moves synchronously through the motor device 120, and a displaying image of the wide-angle lens 111 is outputted.

when the at least one tracking target changes and when a displaying image of the telescope 112 is sufficient to cover the final tracking range as determined in operation S403 according to the magnification of the image and the position, the displaying image of the wide-angle lens 111 is zoomed in. When a viewing angle of the wide-angle lens matches a viewing angle of the telescope, the operation is switched to output the displaying image of the telescope 112, so as to simulate optical zoom for seamless switching; at this time, the operation S404 enters or operates in the separate mode. In the separate mode, the wide-angle lens 111 and the telescope 112 are controlled respectively through the motor device 120, so that the displaying image of the telescope 112 is enlarged to cover the final tracking range, the displaying image of the wide-angle lens 111 is zoomed out to a widest-angle end, and the wide-angle lens 111 returns to a central orientation through the motor device 120. In this way, the wide-angle lens 111 can simultaneously capture the central image (i.e., the image with the largest amplitude), and then the dual-lens movement control method 400 performs auto framing analysis, such as detecting the tracking target, calculating the final tracking range, determining the magnification and position and so forth.

When the at least one tracking target changes again, and when the displaying image of the telescope 112 is incapable of covering the last tracking range as determined in operation S403, the displaying image of the telescope 112 is zoomed out, the displaying image of the wide-angle lens 110 is zoomed in, the wide-angle lens 110 is moved through the motor device 120 until the viewing angle of the wide-angle lens 110 matches the viewing angle of the telescope 112, the operation is switched to output the displaying image of the wide-angle lens 110, so as to simulate optical zoom for seamless switching; at this time, operation S405 enters or operates in the alignment mode.

In the dual-lens movement control method 400, the first independent motor 121 is a first independent horizontal rotation motor, the second independent motor 122 is a second independent horizontal rotation motor, and the common motor 123 is a common horizontal rotation motor. The wide-angle lens 111 and the telescope 112 are arranged in the same rotation axis 101, so that the optical axes of the wide-angle lens 111 and the telescope 112 can be superimposed, so as to simulate the optical zoom.

The dual-lens movement control method 400 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

In view of the above, according to the present disclosure, more effective use of the respective characteristics of the two camera components (i.e., the wide-angle lens 111 and the telescope 112) is accomplished, and the accuracy of the auto framing is improved during automatic tracking.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A dual-lens movement control system, comprising:
a wide-angle lens;
a telescope;
a motor device connected to the wide-angle lens and the telescope; and
a processor electrically connected to the motor device, and the processor configured for:
detecting at least one tracking target through the wide-angle lens, and calculating a final tracking range;
determining a magnification and a position according to the final tracking range; and
determining a separation mode or an alignment mode of operation according to the magnification and the position.

2. The dual-lens movement control system of claim 1, wherein in the alignment mode, the processor moves the wide-angle lens and the telescope synchronously through the motor device, and outputs a displaying image of the wide-angle lens.

3. The dual-lens movement control system of claim 2, wherein when the at least one tracking target changes, and when the processor determines that a displaying image of the telescope is sufficient to cover the final tracking range, the processor starts to zoom in the displaying image of the wide-angle lens, when a viewing angle of the wide-angle lens matches a viewing angle of the telescope, the processor switches to output the displaying image of the telescope and enters the separation mode.

4. The dual-lens movement control system of claim 3, wherein in the separation mode, the processor controls the wide-angle lens and the telescope respectively through the motor device, so that the displaying image of the telescope is enlarged to cover the final tracking range, the displaying image of the wide-angle lens is zoomed out to a widest-angle end, and the wide-angle lens returns to a central orientation through the motor device.

5. The dual-lens movement control system of claim 4, wherein when the at least one tracking target changes again, and when the processor determines that the displaying image of the telescope is incapable of covering the last tracking range, the processor zooms out the displaying image of the telescope, zooms in the displaying image of the wide-angle lens, moves the wide-angle lens through the motor device until the viewing angle of the wide-angle lens matches the viewing angle of the telescope, switches to output the displaying image of the wide-angle lens, and enters the alignment mode.

6. The dual-lens movement control system of claim 1, wherein the wide-angle lens and the telescope are arranged in a same rotation axis, and the motor device comprises a first independent motor, a second independent motor and a common motor, the first independent motor is connected to the wide-angle lens, the second independent motor is connected to the telescope, the common motor is connected to the wide-angle lens and the telescope, the first independent motor is a first independent horizontal rotation motor, the second independent motor is a second independent horizontal rotation motor, and the common motor is a common horizontal rotation motor.

7. The dual-lens movement control system of claim 1, wherein the motor device includes an independent motor and a common motor, the independent motor is connected to the telescope, the common motor is connected to the wide-angle lens and the telescope, and the independent motor is an independent horizontal rotation motor, and the common motor is a common horizontal rotation motor.

8. A dual-lens movement control method to control a wide angle lens and a telescope, comprising steps of:
   detecting at least one tracking target through the wide-angle lens, and calculating a final tracking range;
   determining a magnification and a position according to the final tracking range; and
   determining a separation mode or an alignment mode of operation according to the magnification and the position.

9. The dual-lens movement control method of claim 8, further comprising:
   in the alignment mode, moving the wide-angle lens and the telescope synchronously through a motor device, and outputting a displaying image of the wide-angle lens.

10. The dual-lens movement control method of claim 9, further comprising:
    when the at least one tracking target changes, and when determining that a displaying image of the telescope is sufficient to cover the final tracking range, starting to zoom in the displaying image of the wide-angle lens; and
    when a viewing angle of the wide-angle lens matches a viewing angle of the telescope, switching to output the displaying image of the telescope, and entering the separation mode.

11. The dual-lens movement control method of claim 10, further comprising:
    in the separation mode, controlling the wide-angle lens and the telescope respectively through the motor device, so that the displaying image of the telescope is enlarged to cover the final tracking range, the displaying image of the wide-angle lens is zoomed out to a widest-angle end, and the wide-angle lens returns to a central orientation through the motor device.

12. The dual-lens movement control method of claim 11, further comprising:
    when the at least one tracking target changes again, and when determining that the displaying image of the telescope is incapable of covering the last tracking range, zooming out the displaying image of the telescope, zooming in the displaying image of the wide-angle lens, moving the wide-angle lens through the motor device until the viewing angle of the wide-angle lens matches the viewing angle of the telescope, switching to output the displaying image of the wide-angle lens, and entering the alignment mode.

13. The dual-lens movement control method of claim 8, wherein the wide-angle lens and the telescope are arranged in a same rotation axis, and the motor device comprises a first independent motor, a second independent motor and a common motor, the first independent motor is connected to the wide-angle lens, the second independent motor is connected to the telescope, the common motor is connected to the wide-angle lens and the telescope, the first independent motor is a first independent horizontal rotation motor, the second independent motor is a second independent horizontal rotation motor, and the common motor is a common horizontal rotation motor.

14. The dual-lens movement control method of claim 8, wherein the motor device includes an independent motor and a common motor, the independent motor is connected to the telescope, the common motor is connected to the wide-angle lens and the telescope, and the independent motor is an independent horizontal rotation motor, and the common motor is a common horizontal rotation motor.

15. A non-transitory computer readable medium to store a plurality of instructions for commanding a computer to execute a dual-lens movement control method to control a wide-angle lens and a telescope, and the dual-lens movement control method comprising:
    detecting at least one tracking target through the wide-angle lens, and calculating a final tracking range;
    determining a magnification and a position according to the final tracking range; and
    determining a separation mode or an alignment mode of operation according to the magnification and the position.

16. The non-transitory computer readable medium of claim 15, wherein the dual-lens movement control method further comprises:
    in the alignment mode, moving the wide-angle lens and the telescope synchronously through a motor device, and outputting a displaying image of the wide-angle lens.

17. The non-transitory computer readable medium of claim 16, wherein the dual-lens movement control method further comprises:
    when the at least one tracking target changes, and when determining that a displaying image of the telescope is sufficient to cover the final tracking range, starting to zoom in the displaying image of the wide-angle lens; and
    when a viewing angle of the wide-angle lens matches a viewing angle of the telescope, switching to output the displaying image of the telescope, and entering the separation mode.

18. The non-transitory computer readable medium of claim 17, wherein the dual-lens movement control method further comprises:
    in the separation mode, controlling the wide-angle lens and the telescope respectively through the motor device, so that the displaying image of the telescope is enlarged to cover the final tracking range, the displaying image of the wide-angle lens is zoomed out to a widest-angle end, and the wide-angle lens returns to a central orientation through the motor device.

19. The non-transitory computer readable medium of claim 18, wherein the dual-lens movement control method further comprises:
    when the at least one tracking target changes again, and when determining that the displaying image of the telescope is incapable of covering the last tracking range, zooming out the displaying image of the telescope, zooming in the displaying image of the wide-angle lens, moving the wide-angle lens through the motor device until the viewing angle of the wide-angle lens matches the viewing angle of the telescope, switching to output the displaying image of the wide-angle lens, and entering the alignment mode.

20. The non-transitory computer readable medium of claim 15, wherein the wide-angle lens and the telescope are arranged in a same rotation axis, and the motor device comprises a first independent motor, a second independent motor and a common motor, the first independent motor is connected to the wide-angle lens, the second independent motor is connected to the telescope, the common motor is connected to the wide-angle lens and the telescope, the first independent motor is a first independent horizontal rotation motor, the second independent motor is a second independent horizontal rotation motor, and the common motor is a common horizontal rotation motor.

\* \* \* \* \*